United States Patent
Rodriguez et al.

(10) Patent No.: US 8,762,751 B2
(45) Date of Patent: Jun. 24, 2014

(54) APPARATUS FOR SWITCHING FROM A FIRST COMMUNICATION MODE TO A SECOND COMMUNICATION MODE IN RESPONSE OF DETERMINING THAT THE A POWER PACK OF THE COMMUNICATION DEVICE SATISFIES A CONDITION TO REDUCE ENERGY CONSUMPTION

(75) Inventors: Roberto Rodriguez, Miami, FL (US); Joseph Patino, Miramar, FL (US)

(73) Assignee: BlackBerry Limited, Waterloo, Ontario (CA)

( * ) Notice: Subject to any disclaimer, the term of this patent is extended or adjusted under 35 U.S.C. 154(b) by 340 days.

(21) Appl. No.: 13/174,861

(22) Filed: Jul. 1, 2011

(65) Prior Publication Data

US 2013/0007482 A1 Jan. 3, 2013

(51) Int. Cl.
*G06F 1/00* (2006.01)
*G06F 1/32* (2006.01)
*G06F 11/30* (2006.01)

(52) U.S. Cl.
USPC ............ 713/320; 713/300; 713/340; 713/310

(58) Field of Classification Search
USPC .......... 455/436, 453; 713/153, 340, 320, 310, 713/322, 300; 370/230.1, 229; 340/636.13; 702/132
See application file for complete search history.

(56) References Cited

U.S. PATENT DOCUMENTS

| | | | |
|---|---|---|---|
| 4,870,698 A | 9/1989 | Katsuyama et al. | |
| 5,870,685 A | 2/1999 | Flynn | |
| 6,810,481 B1 * | 10/2004 | Kawade et al. | 713/300 |
| 7,415,621 B2 * | 8/2008 | Odaohhara | 713/300 |
| 7,649,342 B2 * | 1/2010 | Hajiaghajhani | 320/153 |
| RE41,255 E * | 4/2010 | Lee et al. | 702/132 |
| 7,710,868 B2 * | 5/2010 | Tsukizawa | 370/229 |
| 8,078,894 B1 * | 12/2011 | Ogami | 713/321 |
| 2003/0167415 A1 * | 9/2003 | Odaohhara et al. | 713/340 |
| 2006/0025137 A1 * | 2/2006 | Ormson | 455/436 |
| 2008/0080412 A1 | 4/2008 | Cole et al. | |

(Continued)

FOREIGN PATENT DOCUMENTS

| | | |
|---|---|---|
| EP | 1612646 A1 | 1/2006 |
| EP | WO2012016598 A1 * | 8/2010 |

OTHER PUBLICATIONS

Extended European Search Report dated Dec. 20, 2011 for European Patent Application No. 11005381.6.

*Primary Examiner* — Thomas Lee
*Assistant Examiner* — Aurel Prifti
(74) *Attorney, Agent, or Firm* — Jeffrey N. Giunta; Fleit Gibbons Gutman Bongini & Bianco PL

(57) ABSTRACT

An apparatus and method of determining a communications mode. An operating condition of a device is monitored to determine if the operating condition satisfies a condition for loss of charging of a power pack of the device. Examples of operating conditions that satisfy a condition for loss of charging of a power pack of the device include determining that a power pack temperature of the power pack exceeds a power reduction temperature threshold and determining that a net electrical current drawn from the power pack exceeds a net charging electrical current delivered to the power pack. In response to determining that an operating condition of a device satisfies a condition for loss of charging of a power pack of the device, a wireless communications mode of the device is switched from a first mode to a second mode, where the second mode consumes less energy than the first mode.

23 Claims, 3 Drawing Sheets

(56) References Cited

U.S. PATENT DOCUMENTS

| | | |
|---|---|---|
| 2009/0295590 A1 | 12/2009 | Black et al. |
| 2010/0050000 A1* | 2/2010 | Odlund .................. 713/310 |
| 2010/0102982 A1 | 4/2010 | Hoveida |
| 2010/0134305 A1* | 6/2010 | Lu et al. ............. 340/636.13 |
| 2010/0332233 A1 | 12/2010 | Chen et al. |
| 2011/0006739 A1 | 1/2011 | Chishima et al. |
| 2011/0047396 A1* | 2/2011 | Kawamoto et al. .......... 713/322 |
| 2011/0130150 A1* | 6/2011 | Kolding et al. ............... 455/453 |
| 2012/0054512 A1* | 3/2012 | Archibald et al. ............. 713/320 |
| 2012/0159151 A1* | 6/2012 | Janakiraman et al. ........ 713/153 |
| 2013/0039179 A1* | 2/2013 | Chapman et al. .......... 370/230.1 |

* cited by examiner

APPARATUS FOR SWITCHING FROM A FIRST COMMUNICATION MODE TO A SECOND COMMUNICATION MODE IN RESPONSE OF DETERMINING THAT THE A POWER PACK OF THE COMMUNICATION DEVICE SATISFIES A CONDITION TO REDUCE ENERGY CONSUMPTION

FIELD OF THE DISCLOSURE

The present disclosure generally relates to wireless communications devices and more particularly to selecting communications modes within multiple communication mode devices.

BACKGROUND

Electronic devices, such as portable electronic devices, include power packs such as batteries to provide operating power to the device. Devices with power packs also accept power from external supplies to power the electronic device as well as to charge the power pack. Charging circuits in some devices protect power packs by discontinuing charging when the power pack temperature exceeds a threshold. The smaller size combined with increased processing and data rate capacities result in increased buildup of un-dissipated heat in the device. This buildup of heat during normal device operation causes the device's temperature, including the temperature of the power pack, to increase above the level at which charging is discontinued. Although a charging power supply source is connected to the device, the power pack discharges because charging of the power pack is ceased during periods of high, but still expected, power consumption that causes the electronic device to increase in temperature.

Therefore, the ability of electronic devices to operate in high power consumption modes can be affected by heat buildup within the device when operating in a high power consumption mode.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which.

DETAILED DESCRIPTION

Figure 1:
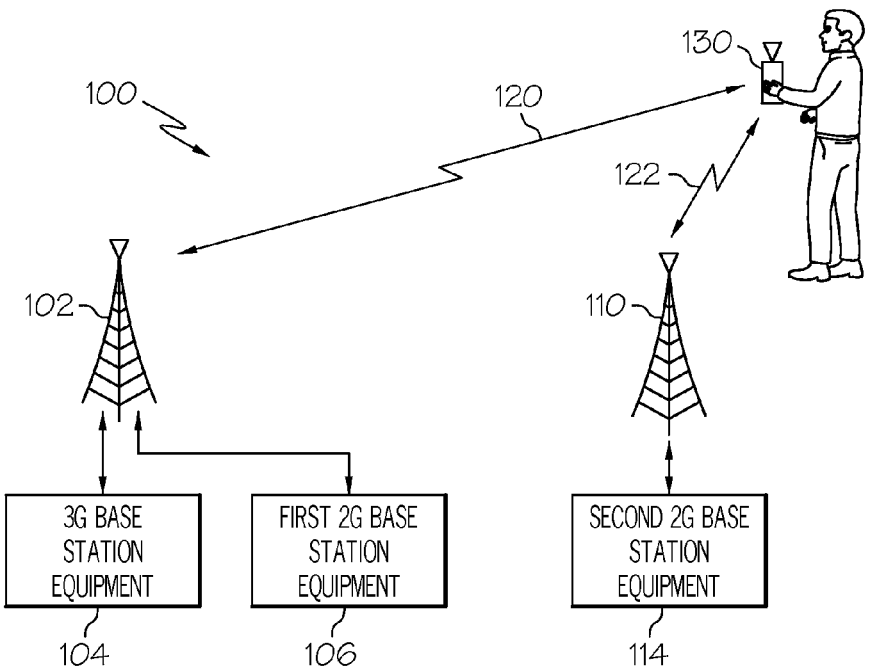
FIG. 1 depicts a wireless communications scenario according to one example.

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the disclosed subject matter in virtually any appropriately detailed structure and function. Further, the terms and phrases used herein are not intended to be limiting, but rather, to provide an understandable description.

The terms "a" or "an", as used herein, are defined as one or more than one. The term plurality, as used herein, is defined as two or more than two. The term another, as used herein, is defined as at least a second or more. The terms "including" and "having," as used herein, are defined as comprising (i.e., open language). The term "coupled," as used herein, is defined as "connected," although not necessarily directly, and not necessarily mechanically. The term "configured to" describes hardware, software or a combination of hardware and software that is adapted to, set up, arranged, built, composed, constructed, designed or that has any combination of these characteristics to carry out a given function. The term "adapted to" describes hardware, software or a combination of hardware and software that is capable of, able to accommodate, to make, or that is suitable to carry out a given function In the following discussion, "power pack capacity" refers to a present energy capacity of a power pack, such as a power pack. For example, power pack capacity may refer to a number of Amp-Hours remaining within a power pack or a percentage of the power pack's total designed capacity when fully charged. Power pack capacity as used below generally refers to a charge level of a power pack or a comparable measure of any suitable power pack.

Described below are systems and methods for use in a wireless communications device that address excessive heating of a power pack, such as a rechargeable battery, in the wireless communications device due to heat buildup caused by high power consumption in that wireless communications device. In a present example, mobile wireless communications devices are able to communicate on a third generation (3G) wireless network, such as the Universal Mobile Telecommunications System (UMTS) network or other higher speed data communications networks. These devices are also able to communicate on the more established, but slower, second generation (2G) networks, such as Global System for Mobile (GSM) network. In conventional operation, the 3G wireless communication device attempts to maintain communications through the 3G UMTS network even when signal conditions for that network are poor, forcing radio frequency signals to be transmitted with relatively high transmit power level.

In general, communications over a 3G network consumes greater power by a wireless communications device. Wireless communications devices typically include transmit power management functions that minimize the transmitted radio frequency power level to a level required to maintain effective communications with a base station or other remote wireless communications device. When a transmitting wireless communications device is physically close to a remote wireless communications device with which it is communicating, the transmitted power is reduced. As the distance between the two devices increases or when the propagation path otherwise deteriorates, the transmitted radio frequency power level is increased to maintain effective communications.

In the example of a 3G wireless communications device that is able to communicate through either the 3G UMTS network or the 2G GSM network, the 3G UMTS communications network typically utilizes wider bandwidth radio communications signals than are used by the 2G GSM communications network. Thus, the 3 G communications circuits generally consume greater amounts of power when operating under poor wireless communications conditions that require an increased level of transmitted radio frequency power.

In one example, a 3G UMTS RF amplifier circuit has been observed to have a radio interface electrical current draw of 210 mA when transmitting at a lower transmitted radio frequency signal power level, but has been observed to have a radio interface electrical current of as much as 724 mA at higher transmitted radio frequency signal power levels. In contrast, a 2G GSM transmitted radio frequency signal amplifier circuit of one example is estimated in the below described algorithms to have a radio interface electrical current draw that is approximated at 280 mA and that is not generally adjusted for output power levels. The much higher radio interface electrical current consumption of the 3G UMTS transmitted radio frequency signal amplifier circuit when transmitting radio frequency signals at higher power levels results in much greater heat dissipation by the transmitted radio frequency signal amplifier circuit than is generated by a 2G GSM transmitted radio frequency signal amplifier circuit. At lower transmitted radio frequency signal power levels, however, there is less of a difference between the radio interface electrical current consumption (and, likewise, the corresponding heat generation) of the 3G UMTS transmitted radio frequency signal amplifier circuit and the 2G GSM transmitted radio frequency signal amplifier circuit.

The heat generated by the 3G UMTS transmitted radio frequency signal amplifier circuit operating at higher transmitted signal power levels can, in turn, cause other elements of the device containing that circuit to heat up. For example, a power pack in the device can be heated to a high temperature due to the power dissipated by the 3G UMTS transmitted radio frequency signal amplifier. Some electronic devices with rechargeable power packs, such as some wireless communications devices that are able to use 3G UMTS networks and 2G GSM networks, monitor the temperature of their power pack or power packs while providing charging current to recharge the power pack or power packs.

Charging of the power pack or of a component power pack in a number of power packs in a device is sometimes halted if the temperature of that power pack exceeds a defined temperature threshold. The temperature threshold for a power pack at which charging is halted is referred to below as a charging cutoff temperature threshold. The temperature of a power pack is able to increase above this charging cutoff temperature threshold due to resistive heating in the power pack caused by the charging current passing through the power pack. As discussed above, the temperature of the power pack is also able to be increased by heat being dissipated by other components of the device in which the power pack is mounted, such as by the operation of radio frequency amplifiers that dissipate heat that is conducted to the power pack. When a 3G UMTS transmitter is consuming higher levels of electrical current to transmit a significantly strong radio frequency signal under poor signal conditions, the heat from that transmitter is able to raise the power pack temperature to the level that halts charging the power pack.

The below described systems and methods are used in a device that incorporates algorithms to monitor quantities present in the device such as the received signal strength of a 3G UMTS signal, transmitted radio frequency signal power levels of the 3G UMTS signal, the temperature of a power pack, such as a rechargeable battery, the net charging electrical current delivered into the power pack, or any combination of these quantities. These algorithms monitor these quantities and determine, based on values of one or more of those quantities, if an operating condition of the device satisfies a condition for loss of charging of a power pack of the device An example of determining that an operating condition of the device that satisfies a condition for loss of charging of a power pack includes determining if the temperature of the power pack has reached a temperature near, but less than the charging cutoff temperature threshold. This new temperature threshold is referred to below as a power reduction temperature threshold.

Another example of determining that an operating condition of the device that satisfies a condition for loss of charging of a power pack includes determining that the wireless communications device is consuming more electrical power than is being delivered by an external power source to charge the power pack, and therefore the power pack is in a net discharging condition. The algorithm of one example causes a reduction in the electrical current drawn from the power pack by switching to communicating on the 2G GSM network instead of the 3G UMTS network when a net electrical current drawn from the power pack exceeds a net charging electrical current delivered to the power pack.

In some examples, switching to communicating on the 2G GSM network instead of the 3G UMTS network is performed in response to determining that an operating condition of the device satisfies a condition for loss of charging of a power pack of the device. This switch is performed when it is determined that there are bad signal conditions for communicating over the 3G UMTS network communications, and therefore high transmitted signal levels are required to perform 3G UMTS network communications. Because the energy consumed by some 3G UMTS radio frequency transmitter circuits in cases of good signal conditions is not significantly less than the energy consumed by 2G GSM radio frequency transmitters, the switching of radio networks in some examples is conditioned upon determining bad signal conditions for communicating over the 3G UMTS network. In cases of bad signal conditions for the 3G UMTS network, switching from communicating over the 3G UMTS network to communicating over the 2G GSM network reduces the electrical current demand of the radio frequency transmission circuits and thereby reduces the associated power dissipation of those circuits and the temperature rise of the wireless communications device.

Switching wireless communications from the 3G UMTS network to the 2G GSM network does not generally affect a user's experience when the user is engaged in a voice call. Switching the network, however, can reduce the electrical current drain and heat generation by the radio frequency circuits of the wireless communications device, particularly if the 3G UMTS signal conditions are poor, such as when the wireless communications device is in a fringe area relative to available 3G UMTS base stations. In an example, switching the communications mode from a 3G UMTS network operating with poor signal conditions to a 2G GSM network that is also operating with poor signal conditions is able to cause a reduction in electrical current consumption and also causes an associated reduction in power dissipation by the electrical current consuming circuits. Such a reduction in electrical current drain provides a substantial reduction in heat generation. This generated heat is conducted to the power pack in many devices, particularly in smaller, more compact device. The reduction in generated heat is able to result in a corresponding improvement in power pack life performance by reducing the operating temperature of the power pack.

In the case of switching between communicating on the 3G UMTS network to communicating on the 2G GSM network when performing an active data session, the inconvenience of a reduced data communications rate may be acceptable in order to achieve the reduction of consumed electrical current and corresponding reduction in generated heat. Switching the wireless communications mode when operating in, for example, poor signal conditions operates to extend the time that charging electrical current is provided to a power pack of the wireless communications device because charging will not be halted due to high power pack temperatures. Continuing to provide charging electrical current to the power pack operates to extend the operating time for the wireless communications device while connected to an external power source.

The following description uses an example of a wireless communications device that is able to communicate in two modes using either a 2G GSM network or a 3G UMTS network. In further examples, the processing described below is able to be applied to switching between two or more communications modes in response to a power pack's temperature exceeding a temperature threshold, referred to below as a power reduction temperature threshold, that is related to the charging cutoff temperature threshold at which charging of the power pack is halted. In an example, the power reduction temperature threshold is set to be several degrees below the charging cutoff temperature threshold so that power reductions are implemented before the charging cutoff temperature threshold is reached. The difference between the charging cutoff temperature threshold and the power reduction temperature threshold is able to be determined by, for example, thermal design analyses of a target device or by empirical observations.

For example, a wireless device including wireless communications equipment for communications on one or more 4G wireless networks as well as equipment for communicating on 3G, 2G, or 3G and 2G wireless networks is able to switch from operating in a mode communicating on a 4G wireless network to a mode communicating on one of a 3G wireless network or 2G wireless network when a power pack temperature of the wireless device exceeds a power reduction temperature threshold. Still further examples support switching to communicating data or voice through other communications modes, such as through a short range wireless communications link incorporating a Bluetooth® protocol or the like, in response to a power pack of the wireless communications device exceeding the power reduction temperature threshold.

FIG. 1 depicts a wireless communications scenario 100 according to one example. The wireless communications scenario 100 depicts a wireless communications device 130 that is in a physical location that supports wireless communications with two base stations, a first base station 102 and a second base station 110. A set of 3G base station equipment 104 and a first set of 2G base station equipment 106 are associated with the first base station 102.

The set of 3G base station equipment 104 is able to support wireless communications with the wireless communications device 130 through a first wireless communications link 120. The set of 3G base station equipment 104 is able to implement, for example, a 3G UMTS network protocol and allow the first base station 102 to be part of a 3G UMTS network. The first set of 2G base station equipment 106 is also able to support wireless communications with the wireless communications device 130 through the first wireless communications link 120. The first set of 2G base station equipment 106 is able to implement, for example, a 2G GSM network protocol and allow the first base station 102 to also be part of a 2G GSM network.

The wireless communications device 130 is therefore able to communicate with the first base station in one of two wireless communications modes. The wireless communications device 130 is able to communicate in a first mode that uses, for example, the 3G UMTS network, or in a second mode that uses, for example, the 2G GSM network. Based upon various factors, such as distance, topology and other propagation factors existing between the wireless communications device 130 and the first base station 102, the signal conditions for one or both modes of wireless communications through the first wireless communications link 120 may be good, poor, or in between. Poor signal conditions generally reflect radio frequency signal degradation during propagation through mechanisms such as distance related losses, multi-path distortion, interference, and other phenomenon that adversely affect wireless communications and signal propagation. In the case of poor signal conditions for the first wireless communications link 120, the wireless communications device generally requires a high level of radio frequency signal transmit power to effectively communicate with the first base station 102 through the 3G UMTS network in a first mode using a 3G wireless network. In such a condition, as is described below, the wireless communications device 130 is able to switch to the second mode of communications with the first base station 102 through the 2G GSM network implemented by the first set of 2G base station equipment 106 associated with the first base station 102. The second mode that uses the 2G GSM network generally consumes less energy than the first mode that uses the 3G UMTS network.

The second base station 110 includes a second set of 2G base station equipment 114 that is able to support wireless communications with the wireless communications device 130 through a second wireless communications link 122. In one example, the second base station 110 does not include a set of 3G base station equipment. In this example, the second set of 2G base station equipment 114 is able to implement the 2G GSM network protocol and allow the second base station 110 to also be part of a 2G GSM network. The wireless communications device 130 is therefore able to communicate with the second base station 110 on the 2G GSM network.

The two illustrated wireless communications links, the first wireless communications link 120 and the second wireless communications link 122, provide two possible wireless communications paths between the wireless communications device 130 and a base station for 2G network communications. One of the two illustrated wireless communications links will generally provide better signal conditions for 2G network communications between the wireless communications device 130 and a base station. These better signal conditions are a result of relative distances, topology, and other factors that exist between the wireless communications device 130 and these two base stations. By switching from communicating over a 3G network to a 2G network, the wireless communications device 130 in this example is able to expand the number of base stations with which it is able to communicate.

Figure 2:
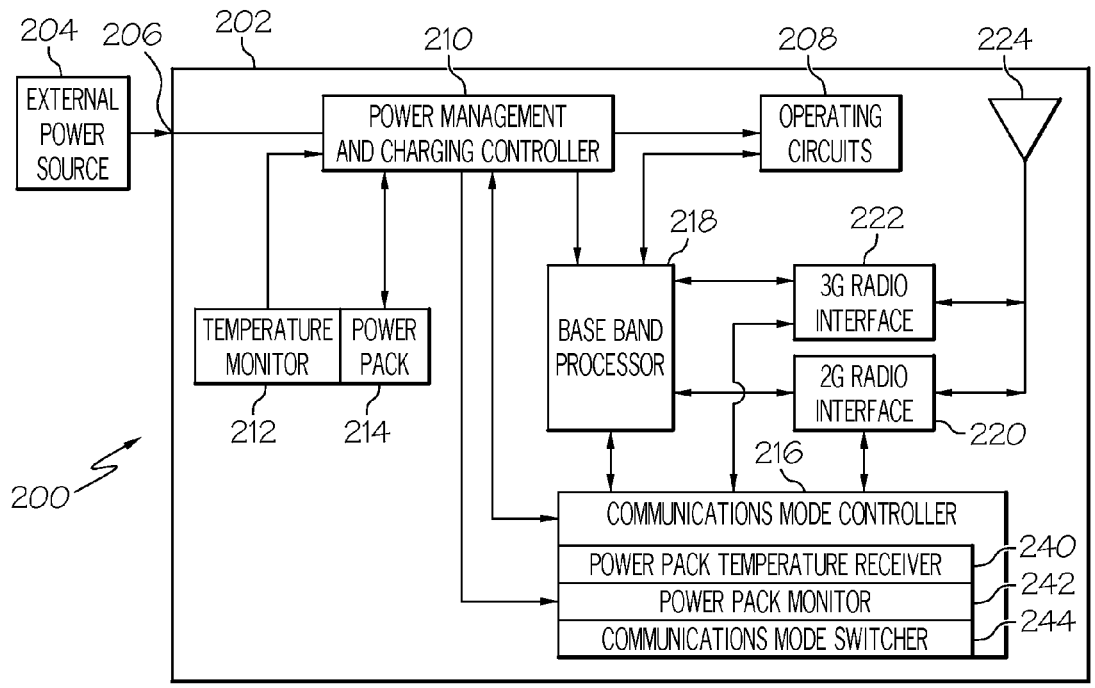
FIG. 2 is a circuit diagram illustrating electrical components of a wireless communication device in accordance with one example.

FIG. 2 is a circuit diagram 200 illustrating electrical components of a wireless communication device in accordance with one example. The circuit diagram 200 illustrates a portion of circuits included in an example of a wireless communications device 130 discussed above. The circuit diagram 200 illustrates components within an example electronic device 202 that is a wireless communications device able to communicate on two radio frequency networks, a 2G network and a 3G network.

The example electronic device 202 includes a power pack 214 to supply electrical power to various circuits within the example electronic device 202. The power pack 214 in one example includes a rechargeable battery. Further examples include any type of power pack 214 that is able to supply the power demands of the example electronic device 202 and that is able to accept electrical charging current from an external source.

In the circuit diagram 200, an external power source 204 is connected to the example electronic device 202 through an external power connection 206. The example electronic device 202 includes a power management and charging controller 210 that controls charging the power pack 214 when the external power source 204 is connected to the external power connector 206. The power management and charging controller 210 modifies an amount of charging electrical current delivered to the power pack 214 based upon a determined present power pack capacity of the power pack 214 and other factors. In various examples, the power management and charging controller 210 also regulates and conditions electrical power obtained from either the power pack 214 or external power source 204 and provides that regulated power to the various circuits of the example electronic device 202.

The power pack 214 of one example includes a temperature monitor 212 that determines the temperature of the power pack 214 and reports that temperature to the power management and charging controller 210. The power management and charging controller 210 in one example stops charging the power pack 214, by ceasing delivering the charging electrical current to the power pack 214, when the temperature of the power pack 214 exceeds a charging cutoff temperature threshold. Once the temperature of the power pack 214 goes below that charging cutoff temperature threshold, the power management and charging controller 210 resumes charging of the power pack by delivering charging electrical current to the power pack 214.

The power pack 214 is used as a power source when, for example, the external power source 204 is not connected to the example electronic device 202. The power pack 214 is also able to augment power provided by the external power source 204 to the example electronic device 202 when the example electronic device 202 draws more electrical current than is provided by the external power source 204. In one example, the power management and charging controller 210 includes an electrical current monitor that measures a net electrical current that is drawn from the power pack and also measures a net charging electrical current delivered to the power pack.

The example electronic device 202 includes operating circuits 208 that are electronic circuits configured to perform, for example, processing associated with a cellular telephone, a smart phone, a personal digital assistant (PDA), or some or all of any processing required by the example electronic device 202. In various examples, the operating circuits include data processing circuits, voice processing circuits, or combinations of data and voice processing circuits that process data, voice, or data and voice in conjunction with actions taken by a user of the example electronic device 202. The operating circuits are able to receive, transmit, or receive and transmit data, voice, or data and voice signals with remote devices through radio interfaces.

The example electronic device 202 further includes a baseband processor 218, a 2G radio interface 220 to perform 2G network communications and a 3G radio interface 222 to perform 3G network communications. The baseband processor 218 is able to be configured to select using one of the 2G radio interface 220 or the 3G radio interface 222 to receive and send voice and data on either a 2G network or a 3G network, respectively. The example electronic device 202 includes a 2G radio interface 220 and a 3G radio interface 222 that implement, respectively, wireless communications through antenna 224 for their respective networks.

The example electronic device 202 further includes a communications mode controller 216. The communications mode controller 216 may be implemented as a stand-alone circuit or controller/processor, such as an application specific integrated circuit (ASIC) or may be integrated into the functions performed by a main processor or other controller of the electronic device 202. The communications mode controller 216 of one example includes a power pack temperature receiver 240 that receives a present power pack temperature of the power pack 214. The communications mode controller 216 receives power pack temperature data from either the temperature monitor 212 or the power management and charging controller 210 depending on the design of the particular device. The communications mode controller 216 also receives, from the power management and charging controller 210, an indication that the power pack 214 is being charged. The communications mode controller 216 further receives, from the power management and charging controller 210, indications of the net electrical charging current being delivered to the power pack 214. These indications allow determining that a net electrical current drawn from the power pack exceeds a net charging electrical current delivered to the power pack. The communications mode controller 216 also receives a present 3G transmitted signal power from the 3G radio interface 222 and a 2G network availability indicator from the 2G radio interface 220.

The communications mode controller 216 further includes a power pack monitor 242 that, as is described in further detail below, implements an algorithm to determine that an operating condition of the device satisfies a condition for loss of power pack charging, and also determines, based upon the selected algorithm, that other criteria are satisfied to require that the energy consumption of the device be reduced. Examples of determining that an operating condition of the device satisfies a condition for loss of power pack charging include determining that a power pack temperature of the power pack exceeds a power reduction temperature threshold; determining, in response to determining that the power pack is being charged, that a net electrical current drawn from the power pack exceeds a net charging electrical current delivered to the power pack; or determining both of these conditions.

In one example, the power reduction temperature threshold is related to the charging cutoff temperature threshold and is set to be a few degrees below the charging cutoff temperature threshold. The power reduction temperature threshold is configured or programmed into the communications mode controller 216 during device manufacturing or configuration. The power reduction temperature threshold in other examples is able to be provided to the communications mode controller 216 by any technique, as is known to those skilled in the arts.

The communications mode controller 216 also includes a communications mode switcher 244 that switches, in response to the power pack monitor determining that the operating condition of the device satisfies the condition for loss of power pack charging, a wireless communications mode of the device from a first mode to a second mode. An example of the first mode includes a first wireless communications protocol, such as the 3G UMTS protocol for communications on the 3G UMTS network. An example of the second mode includes a second wireless communications protocol, such as the 2G GSM protocol for communications on the 2G GSM network. In this example, the second mode consumes less energy than the first mode.

As is described in further detail below, the communications mode controller 216 receives data related to charging of the power pack 214 and indicating the present wireless communications conditions such as transmitted radio frequency signal power levels and availability of a 2G wireless network for communications. Based upon these data items, the communications mode controller 216 determines which wireless network to use for communications and causes switching of the communications modes if required.

The communications mode controller 216 of one example receives a present wireless network selection indicator from the baseband processor 218, which indicates which wireless network, such as a 2G GSM network or a 3G UMTS network, is currently being used. The present wireless network selection is used to determine, for example, if switching of communications modes is required or if the selected communications mode is already being used.

In an example, the power pack monitor 242 within the communications mode controller 216 receives power pack charging data from the power management and charging controller 210. The communications mode controller 216 receives power pack charging data that includes, for example, an indicator of whether an external power source 204 is connected to the example electronic device 202 and if the power pack 214 is being charged. The communications mode controller 216 of one example further receives an indicator of the net electrical current drawn from the power pack and a net charging electrical current delivered to the power pack. These net electrical current values are determined in one example by circuits within the power management and charging controller 210.

The communications mode controller 216 analyzes the values of these received data items. Based upon algorithms programmed into the communications mode controller 216 and upon the values of the received data, the communications mode controller 216 determines if the electrical power consumption of the example electronic device 202 should be reduced. As described below, the decision to reduce power consumption is able to be based upon the temperature of the power pack 214 or net current drain from the power pack 214. In response to determining that power consumption should be reduced, the communications mode controller 216 is able to cause wireless communications to switch from a mode that communicates over a 3G network to a mode that communicates over a 2G wireless network. This switch in communications mode causes the example electronic device to use the 2G radio interface 220, which has a lower radio interface electrical current demand relative to the 3G radio interface 222, for wireless voice or data communications. Reducing power consumption of the example electronic device 202 can result in less power consumption and correspondingly lower temperatures of the power pack 214. Reducing the power consumption of the example electronic device 202 when the external power source is providing less power than is consumed by the example electronic device 202 reduces the rate of depletion of the power pack 214 and allows for longer operation.

Figure 3:
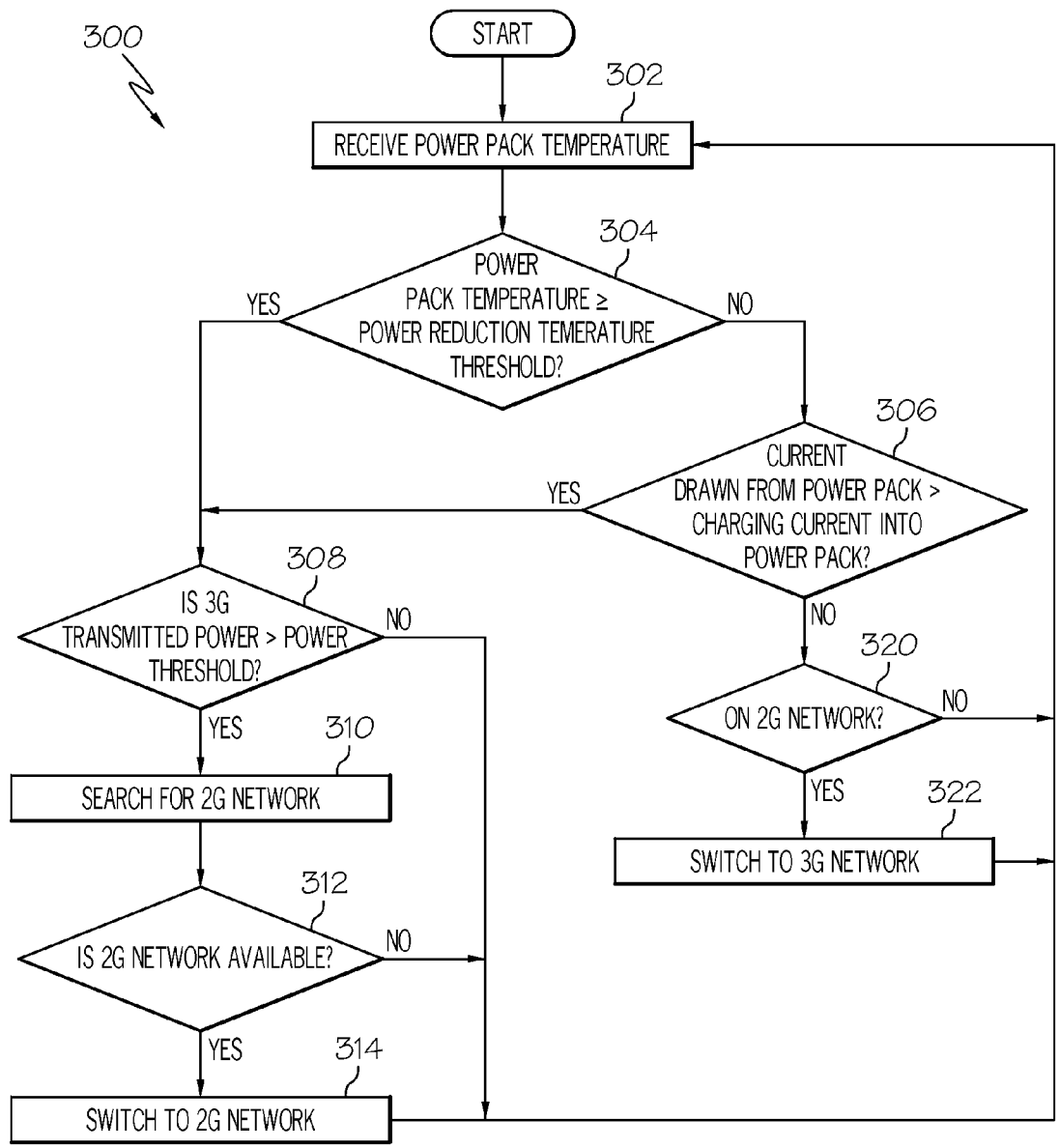
FIG. 3 illustrates a wireless communications mode determination processing flow, in accordance with one example.

FIG. 3 illustrates a wireless communications mode determination processing flow 300, in accordance with one example. The wireless communications mode determination processing flow 300 is performed, for example, by the communications mode controller 216 of an example electronic device 202, described above. The temperature reducing wireless communications mode determination processing flow 300 operates based on data received from various components of the example electronic device 202. The data processed by the wireless communications mode determination processing flow 300 indicates, for example, power pack temperatures, present 3G transmitted signal power level, present net electrical charging current to and net electrical current drain from the power pack, and the present availability of 2G network communications.

The wireless communications mode determination processing flow 300 begins by receiving, at 302, the present power pack temperature. The present power pack temperature in one example is determined by the temperature monitor 212 and communicated to the communications mode controller 216 through the power management and charging controller 210. The temperature of the power pack is used by the power management and charging controller 210 to, for example, cease charging of the power pack in response to determining that the power pack temperature exceeds a charging cutoff temperature threshold. The temperature threshold at which charging ceases is based upon the design and characteristics of the power pack and is specified by the supplier of a particular power pack or derived by analysis or experimentally. In various examples, power packs such as rechargeable batteries have a specified temperature threshold, the charging cutoff temperature threshold, above which charging of the power pack is suspended. In one example, power pack charging is performed as long as the temperature of the power pack is below 45° C. In some examples, charging is able to continue until the power pack exceeds 55° C. Once the power pack temperature exceeds the configured charging cutoff temperature threshold, charging of the power pack stops, even if an external power source 204 is connected and able to provide charging electrical current to the power pack.

The wireless communications mode determination processing flow 300 begins by determining that the operating condition of the device satisfies the condition for loss of power pack charging by determining, at 304, if the power pack temperature is greater than or equal to the power reduction temperature threshold. If the power pack temperature is not greater than or equal to the power reduction temperature threshold, the wireless communications mode determination processing flow 300 continues to determine whether the operating condition of the device satisfies the condition for loss of power pack charging by determining, at 306, if the net electrical current drawn from the power pack is greater than (i.e. exceeds) the net charging electrical current being delivered to the power pack. In various examples it is possible for an external power source to be connected to the device to charge the power pack but the power consumption of the device exceeds the capacity of the external power source. In that case, the power pack supplies the additional power required by the device. A device drawing more electrical power than can be supplied by the external power source 204 causes depletion of the power pack even though a user expects the power pack to be charging. Determination of either of these two conditions, in one example, determines that the operating condition of the device satisfies the condition for loss of power pack charging. Power pack charging is lost either by charging electrical current being eminently removed by the over-temperature condition of the power pack, or power pack charging is lost by electrical circuits within the device drawing more electrical current than is provided by the external power source 204, thereby "starving" the power pack of charging electrical current. In response to this decision, the wireless communications mode determination processing flow 300 reduces the power or electrical current drawn by the circuits of the device.

In various examples, the determination that the electrical current drawn from the power pack exceeds the electrical current provided to charge the power pack is able to time filter or otherwise condition the actual electrical current measurements as part of the decision to reduce the power or electrical current drawn by the circuits of the device based upon net charging electrical current flows into the power pack. For example, this determination is able to average, integrate, perform another type of time filtering, combine the net current with other parameters, or is able include any combination of these processes to further condition the outcome of the determination to lower energy consumption. In one example, net electrical current flow into the power pack is combined with the present remaining power capacity of the power pack and the decision to reduce the electrical current draw of the device based upon net charging electrical current flows into the power pack is not made until the remaining power capacity of the power pack falls below a particular level. In another example, the decision to reduce the electrical current draw of the device based upon net charging electrical current flows into the power pack is not made unless the net charging electrical current into the power pack is negative for a period of time.

If it is determined, at 306, that the electrical current drawn from the power pack is not greater than the charging electrical current being delivered to the power pack, the process determines if wireless communications should switch to the 3G wireless network. Switching to a 3G wireless network is performed in some examples in order to provide higher speed external data communications to the device in the case where the electrical current drawn from the power pack is not in excess of that delivered by the external supply. In the case where charging the power pack 214 requires less electrical current than is able to be supplied by the external power source 204, it is determined to use the extra electrical current capacity of the external power source to support communications on the 3G wireless network. In response to determining that the electrical current drawn from the power pack is not greater than the charging electrical current being delivered to the power pack, the wireless communications mode determination processing flow 300 determines, at 320, if the device is communicating on the 2G wireless network. If it is determined that the device is communicating on the 2G wireless network, the wireless communications mode determination processing flow 300 switches, at 322, to communication on the 3G network.

In response to determining that the power pack temperature is greater than or equal to a power reduction temperature threshold at 304 or that the electrical current drawn from the power pack is greater than the charging electrical current being delivered to the power pack at 306, the wireless communications mode determination processing flow 300 continues to determine, at 308, if the transmitted radio frequency power level for communications on the 3G wireless network exceeds a power threshold. In some examples of good signal conditions for communicating on the 3G wireless network, 3G radio interface 222 consumes an amount of electrical energy commensurate with the electrical energy consumed by the 2G radio interface 220. Therefore, when good signal conditions for 3 G communications exist and the 3G radio interface consumes a relatively lower amount of energy due to lower transmitted radio frequency signal power, the wireless communications mode determination processing flow 300 of one example is configured to not switch to communicating on the 2G wireless network because the reduction in energy consumption and the related generation of heat may not be significant.

The power threshold configured for the determination at 308 is able to be determined by any technique, such as analysis of energy consumption by the 2G radio interface 220 and the 3G radio interface 222 or by empirical measurements of energy consumed by the two radio interfaces for different transmitted radio frequency power levels. The power threshold is able to be set, for example, at a transmitted radio frequency power level where the energy consumed by the 3G radio interface 222 exceeds a maximum expected level of electrical current or energy consumption by the 2G radio interface 220. In other examples, the power threshold is able to be set at a higher level to only implement switching to communications on the 2G wireless network when a higher level of savings in energy or heat generation is realized.

If it is determined, at 308, that the transmitted radio frequency power level for communications on the 3G wireless network does exceed the power threshold, the wireless communications mode determination processing flow 300 searches, at 310, for available communications on a 2G wireless network. This determination is made, for example, by using the 2G radio interface 220 to sense the presence of 2G wireless network signals being received by the device. The wireless communications mode determination processing flow 300 determines, at 312, if communications are available on a 2G wireless network. If communications are available on a 2G wireless network, the wireless communications mode determination processing flow 300 switches, at 314, to communicating on the 2G wireless network. In the event that it was determined that the device is not communicating on a 2G wireless network at 320, the radio frequency transmission level for communications on the 3G wireless network does not exceed a threshold at 308, or that communications is not available on a 2G wireless network at 312, or after switching to a 2G network at 314, the wireless communications mode determination processing flow 300 returns to receiving, at 302, the present power pack temperature and the processing described above repeats.

Figure 4:
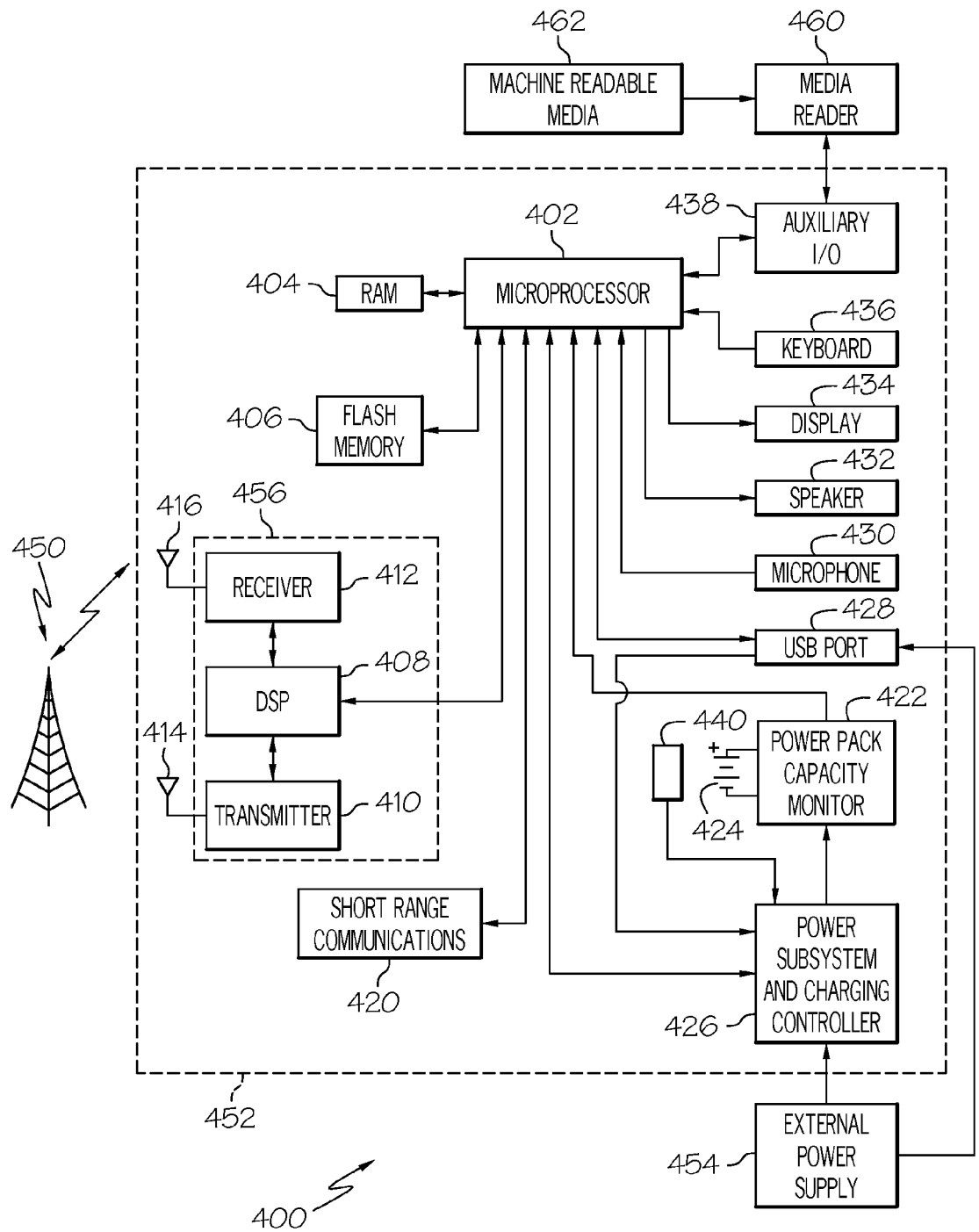
FIG. 4 is a block diagram of an electronic device and associated components in which the systems and methods disclosed herein may be implemented.

FIG. 4 is a block diagram of an electronic device and associated components 400 in which the systems and methods disclosed herein may be implemented. In this example, an electronic device 452 is a wireless two-way communication device with voice and data communication capabilities, such as the wireless communications device 130 and the example electronic device 202. Such electronic devices communicate with a wireless voice or data network 450 using a suitable wireless communications protocol. Wireless voice communications are performed using either an analog or digital wireless communication channel. Data communications allow the electronic device 452 to communicate with other computer systems via the Internet. Examples of electronic devices that are able to incorporate the above described systems and methods include, for example, a data messaging device, a two-way pager, a cellular telephone with data messaging capabilities, a wireless Internet appliance or a data communication device that may or may not include telephony capabilities.

The illustrated electronic device 452 is an example electronic device that includes two-way wireless communications functions. Such electronic devices incorporate a communication subsystem 456 that includes elements such as a wireless transmitter 410, a wireless receiver 412, and associated components such as one or more antenna elements 414 and 416. A digital signal processor (DSP) 408 performs processing to extract data from received wireless signals and to generate signals to be transmitted. The particular design of the communication subsystem 456 is dependent upon the communication network and associated wireless communications protocols with which the device is intended to operate.

The electronic device 452 includes a microprocessor 402 that controls the overall operation of the electronic device 452. The microprocessor 402 interacts with the above described communications subsystem elements and also interacts with other device subsystems such as flash memory 406, random access memory (RAM) 404, auxiliary input/output (I/O) device 438, universal serial bus (USB) Port 428, display 434, keyboard 436, speaker 432, microphone 430, a short-range communications subsystem 420, a power pack capacity monitor 422, a power subsystem and charging controller 426, and any other device subsystems.

A power pack 424 is connected to a power pack capacity monitor 422 and a power subsystem and charging controller 426 as is described in detail above. The power pack 424 provides power to the circuits of the electronic device 452. The power subsystem and charging controller 426 includes power distribution circuitry for providing power to the electronic device 452 and also contains power pack charging controller circuitry to manage recharging the power pack 424. The power subsystem and charging controller 426 receives power from an external power supply 454 that is connected through a power connector of the electronic device 452 or through the USB port 428. A power pack temperature monitor 440 monitors the temperature of the power pack 424 and reports the temperature to the power subsystem and charging controller 426. The power subsystem and charging controller 426 halts charging when the power pack temperature exceeds a charging cutoff temperature threshold. The power subsystem and charging controller 426 and associated components is described above in further detail with regards to FIG. 2.

The microprocessor 402 monitors the status and indications produced by the power pack capacity monitor 422 and the power subsystem and charging controller 426 to perform the processing described above with regards to FIG. 3. The power subsystem and charging controller 426 includes a power pack monitoring circuit that is operable to provide a status of one or more power pack status indicators, such as remaining power pack capacity, temperature, voltage, electrical current consumption, and the like, to various components of the electronic device 452.

The USB port 428 provides data communication between the electronic device 452 and one or more external devices. Data communication through USB port 428 enables a user to set preferences through the external device or through a software application and extends the capabilities of the device by enabling information or software exchange through direct connections between the electronic device 452 and external data sources rather than through a wireless data communication network.

Operating system software used by the microprocessor 402 is stored in flash memory 406. Further examples are able to use a power pack backed-up RAM or other non-volatile storage data elements to store operating systems, other executable programs, or both. The operating system software, device application software, or parts thereof, are able to be temporarily loaded into volatile data storage such as RAM 404. Data received via wireless communication signals or through wired communications are also able to be stored to RAM 404. As an example, a computer executable program configured to implement the wireless communications mode determination processing flow 300, described above, is included in a software module stored in flash memory 406.

The microprocessor 402, in addition to its operating system functions, is able to execute software applications on the electronic device 452. A predetermined set of applications that control basic device operations, including at least data and voice communication applications, is able to be installed on the electronic device 452 during manufacture. Examples of applications that are able to be loaded onto the device may be a personal information manager (PIM) application having the ability to organize and manage data items relating to the device user, such as, but not limited to, e-mail, calendar events, voice mails, appointments, and task items.

Further applications may also be loaded onto the electronic device 452 through, for example, the wireless network 450, an auxiliary I/O device 438, USB port 428, short-range communications subsystem 420, or any combination of these interfaces. Such applications are then able to be installed by a user in the RAM 404 or a non-volatile store for execution by the microprocessor 402.

In a data communication mode, a received signal such as a text message or web page download is processed by the communication subsystem, including wireless receiver 412 and wireless transmitter 410, and communicated data is provided the microprocessor 402, which is able to further process the received data for output to the display 434, or alternatively, to an auxiliary I/O device 438 or the USB port 428. A user of the electronic device 452 may also compose data items, such as e-mail messages, using the keyboard 436, which is able to include a complete alphanumeric keyboard or a telephone-type keypad, in conjunction with the display 434 and possibly an auxiliary I/O device 438. Such composed items are then able to be transmitted over a communication network through the communication subsystem.

For voice communications, overall operation of the electronic device 452 is substantially similar, except that received signals are generally provided to a speaker 432 and signals for transmission are generally produced by a microphone 430. Alternative voice or audio I/O subsystems, such as a voice message recording subsystem, may also be implemented on the electronic device 452. Although voice or audio signal output is generally accomplished primarily through the speaker 432, the display 434 may also be used to provide an indication of the identity of a calling party, the duration of a voice call, or other voice call related information, for example.

Depending on conditions or statuses of the electronic device 452, one or more particular functions associated with a subsystem circuit may be disabled, or an entire subsystem circuit may be disabled. For example, if the power pack temperature is high, then voice functions may be disabled, but data communications, such as e-mail, may still be enabled over the communication subsystem.

A short-range communications subsystem 420 is a further optional component which may provide for communication between the electronic device 452 and different systems or devices, which need not necessarily be similar devices. For example, the short-range communications subsystem 420 may include an infrared device and associated circuits and components or a Radio Frequency based communication module such as one supporting Bluetooth® communications, to provide for communication with similarly-enabled systems and devices.

A media reader 460 is able to be connected to an auxiliary I/O device 438 to allow, for example, loading computer readable program code of a computer program product into the electronic device 452 for storage into flash memory 406. One example of a media reader 460 is an optical drive such as a CD/DVD drive, which may be used to store data to and read data from a computer readable medium or storage product such as computer readable storage media 462. Examples of suitable computer readable storage media include optical storage media such as a CD or DVD, magnetic media, or any other suitable data storage device. Media reader 460 is alternatively able to be connected to the electronic device through the USB port 428 or computer readable program code is alternatively able to be provided to the electronic device 452 through the wireless network 450.

Information Processing System

The present subject matter can be realized in hardware, software, or a combination of hardware and software. A system can be realized in a centralized fashion in one computer system, or in a distributed fashion where different elements are spread across several interconnected computer systems. Any kind of computer system—or other apparatus adapted for carrying out the methods described herein—is suitable. A typical combination of hardware and software could be a general purpose computer system with a computer program that, when being loaded and executed, controls the computer system such that it carries out the methods described herein.

The present subject matter can also be embedded in a computer program product, which comprises all the features enabling the implementation of the methods described herein, and which—when loaded in a computer system—is able to carry out these methods. Computer program in the present context means any expression, in any language, code or notation, of a set of instructions intended to cause a system having an information processing capability to perform a particular function either directly or after either or both of the following a) conversion to another language, code or, notation; and b) reproduction in a different material form.

Each computer system may include, inter alia, one or more computers and at least a computer readable medium allowing a computer to read data, instructions, messages or message packets, and other computer readable information from the computer readable medium. The computer readable medium may include computer readable storage medium embodying non-volatile memory, such as read-only memory (ROM), flash memory, disk drive memory, CD-ROM, and other permanent storage. Additionally, a computer medium may include volatile storage such as RAM, buffers, cache memory, and network circuits. Furthermore, the computer readable medium may comprise computer readable information in a transitory state medium such as a network link and/or a network interface, including a wired network or a wireless network, that allow a computer to read such computer readable information.

Non-Limiting Examples

Although specific embodiments of the subject matter have been disclosed, those having ordinary skill in the art will understand that changes can be made to the specific embodiments without departing from the spirit and scope of the disclosed subject matter. The scope of the disclosure is not to be restricted, therefore, to the specific embodiments, and it is intended that the appended claims cover any and all such applications, modifications, and embodiments within the scope of the present disclosure.

What is claimed is:

1. A method of operating a communication device, the method comprising:
performing the following with a processor:
determining that a measured power pack value of a communication device satisfies a condition to reduce energy consumption, the condition to reduce energy consumption comprising a net electrical current drawn from the power pack exceeding a net charging electrical current delivered to the power pack, and
a power pack temperature exceeding a power reduction temperature threshold, the power reduction temperature threshold being less than a charging cutoff temperature threshold corresponding to a condition for loss of charging of the power pack of the device; and
switching, in response to determining that the measured power pack value of the communication device satisfies the condition to reduce energy consumption, a wireless communications mode of the device from a first mode to a second mode, the second mode consuming less energy than the first mode.

2. The method of claim 1,
wherein the determining that the measured power pack value of the device satisfies the condition to reduce energy consumption comprises determining that the power pack temperature of the power pack exceeds the power reduction temperature threshold, and
wherein the switching is in response to the determining that the power pack temperature of the power pack for the device exceeds the power reduction temperature threshold.

3. The method of claim 1, wherein the second mode comprises communicating on a 2G wireless network.

4. The method of claim 1, further comprising:
determining that the power pack is being charged,
wherein the determining that the measured power pack value comprises determining, in response to determining that the power pack is being charged, that a net electrical current drawn from the power pack exceeds a net charging electrical current delivered to the power pack, and
wherein the switching is in response to determining that the net electrical current drawn from the power pack exceeds the net charging electrical current delivered to the power pack.

5. The method of claim 1, further comprising:
determining, in response to determining that the measured power pack value satisfies the condition for loss of power pack charging, that a transmitted radio frequency power level for the first mode exceeds a power threshold, and
wherein the switching is further performed in response to determining that the transmitted radio frequency power level for the first mode exceeds the power threshold.

6. The method of claim 5, wherein the power threshold corresponds to a power level where a radio interface for the first mode draws a first radio interface electrical current that is greater than a second radio interface electrical current, the second radio interface electrical current corresponds to electrical current drawn by a radio interface for the second mode.

7. An apparatus comprising:
a power pack temperature receiver configured to receive a present power pack temperature of a power pack of the apparatus;
a power pack monitor, coupled to the power pack temperature receiver, configured to determine that a measured power pack value of the apparatus satisfies a condition to reduce energy consumption, the condition to reduce energy consumption comprising:
a net electrical current drawn from the power pack exceeding a net charging electrical current delivered to the power pack, and a power pack temperature exceeding a power reduction temperature threshold, the power reduction temperature threshold being less than a charging cutoff temperature threshold corresponding to a condition for loss of power pack charging; and a communications mode switcher, coupled to the power pack monitor, configured to switch, in response to the power pack monitor determining that the measured power pack value of the apparatus satisfies the condition to reduce energy consumption, a wireless communications mode of the apparatus from a first mode to a second mode, the second mode consuming less energy than the first mode.

8. The apparatus of claim 7, wherein the communications mode switcher is configured to determine that the measured power pack value of the apparatus satisfies the condition to reduce energy consumption by, at least in part, determining that a power pack temperature of the power pack exceeds a power reduction temperature threshold, and wherein the communications mode switcher is configured to switch in response to the determining that the power pack temperature of the power pack exceeds the power reduction threshold.

9. The apparatus of claim 7, wherein the second mode comprises communicating on a 2G wireless network.

10. The apparatus of claim 7, the communications mode switcher being further configured to determine that the power pack is being charged, wherein the communications mode switcher is configured to determine that the measured power pack value of the apparatus satisfies the condition to reduce energy consumption by, at least in part, determining, in response to determining that the power pack is being charged, that a net electrical current drawn from the power pack exceeds a net charging electrical current delivered to the power pack, and wherein the communications mode switcher is configured to switch in response to determining that the net electrical current drawn from the power pack exceeds the net charging electrical current delivered to the power pack.

11. The apparatus of claim 7, the communications mode switcher further configured to determine, in response to determining that the measured power pack value of the apparatus satisfies the condition to reduce energy consumption, that a transmitted radio frequency power level for the first mode exceeds a power threshold, and wherein the communications mode switcher is further configured to switch in further response to determining that the transmitted radio frequency power level for the first mode exceeds the power threshold.

12. The apparatus of claim 11, wherein the power threshold corresponds to a power level where a radio interface for the first mode draws a first radio interface electrical current that is greater than a second radio interface electrical current, the second radio interface electrical current corresponding to electrical current drawn by a radio interface for the second mode.

13. A computer program product comprising non-transient computer readable storage medium having computer readable program code embodied therewith, the computer readable program code comprising instructions for:

determining that an measured power pack value of a device satisfies a condition to reduce energy consumption, the condition to reduce energy consumption comprising:

a net electrical current drawn from the power pack exceeding a net charging electrical current delivered to the power pack, and a power pack temperature exceeding a power reduction temperature threshold, the power reduction temperature threshold being less than a charging cutoff temperature threshold corresponding to a condition for loss of charging of the power pack of the device; and switching, in response to determining that the measured power pack value of the device satisfies the condition to reduce energy consumption, a wireless communications mode of the device from a first mode to a second mode, the second mode consuming less energy than the first mode.

14. The computer program product of claim 13, wherein the instructions for determining comprise instructions for determining that a power pack temperature of the power pack exceeds a power reduction temperature threshold, and wherein the instructions for switching are executed in response to the determining that the power pack temperature of the power pack for the device exceeds the power reduction temperature threshold.

15. The computer program product of claim 13, wherein the second mode comprises communicating on a 2G wireless network.

16. The computer program product of claim 13, the computer readable program code further comprising instructions for determining that the power pack is being charged, wherein the instructions for determining that the measured power pack value of the device satisfies the condition to reduce energy consumption comprise instructions for determining, in response to determining that the power pack is being charged, that a net electrical current drawn from the power pack exceeds a net charging electrical current delivered to the power pack, and wherein the instructions for switching are executed in response to determining that the net electrical current drawn from the power pack exceeds the net charging electrical current delivered to the power pack.

17. The computer program product of claim 13, the computer readable program code further comprising instructions for:

determining, in response to determining that the measured power pack value of the device satisfies the condition to reduce energy consumption, that a transmitted radio frequency power level for the first mode exceeds a power threshold, and wherein the instructions for switching are further executed in response to determining that the transmitted radio frequency power level for the first mode exceeds the power threshold.

18. The computer program product of claim 17, wherein the power threshold corresponds to a power level where a radio interface for the first mode draws a first radio interface electrical current that is greater than a second radio interface electrical current, the second radio interface electrical current corresponds to electrical current drawn by a radio interface for the second mode.

19. A communications circuit, comprising:

a power pack;

a radio interface configured to selectively wirelessly communicate according to a first wireless communications protocol and to wirelessly communicate in a second wireless communications protocol;

a power pack temperature receiver configured to receive a present power pack temperature of a power pack of a device;

a power pack monitor, coupled to the power pack temperature receiver, configured to determine, that a measured power pack value of the device satisfies a condition to reduce energy consumption, the condition to reduce energy consumption comprising:
  a net electrical current drawn from the power pack exceeding a net charging electrical current delivered to the power pack, and
  a power pack temperature exceeding a power reduction temperature threshold, the power reduction temperature threshold being less than a charging cutoff temperature threshold corresponding to a condition for loss of power pack charging; and
a communications mode switcher, coupled to the power pack monitor, configured to switch, in response to the power pack monitor determining that the measured power pack value of the device satisfies the condition to reduce energy consumption, a wireless communications mode of the device from a first mode to a second mode, the second mode consuming less energy than the first mode.

20. The communications circuit of claim 19, the communications mode switcher being further configured to determine that the power pack is being charged,
  wherein the communications mode switcher is configured to determine that the measured power pack value of the device satisfies the condition to reduce energy consumption by, at least in part, determining, in response to determining that the power pack is being charged, that a net electrical current drawn from the power pack exceeds a net charging electrical current delivered to the power pack, and
  wherein the communications mode switcher is further configured to switch in further response to determining that the net electrical current drawn from the power pack exceeds the net charging electrical current delivered to the power pack.

21. The communications circuit of claim 19, the communications mode switcher further configured to determine, in response to determining that the measured power pack value of the device satisfies the condition to reduce energy consumption, that a transmitted radio frequency power level for the first mode exceeds a power threshold, and
  wherein the communications mode switcher is further configured to switch in response to determining that the transmitted radio frequency power level for the first mode exceeds the power threshold.

22. The communications circuit of claim 21, wherein the power threshold corresponds to a power level where a radio interface for the first wireless communications protocol draws a first radio interface electrical current that is greater than a second radio interface electrical current, the second radio interface electrical current corresponds to electrical current drawn by a radio interface for the second wireless communications protocol.

23. A portable electronic device that determines a communications mode, the portable electronic device comprising:
  an operating circuit;
  a power pack;
  a processor, configured to:
  determine, that a measured power pack value of the power pack satisfies a condition to reduce energy consumption, the condition to reduce energy consumption comprising
    a net electrical current drawn from the power pack exceeding a net charging electrical current delivered to the power pack, and
    a power pack temperature exceeding a power reduction temperature threshold, the power reduction temperature threshold being less than a charging cutoff temperature threshold corresponding to a condition for loss of charging of the power pack of the device; and
  switch, in response to determining that the measured power pack value satisfies the condition to reduce energy consumption, a wireless communications mode of the device from a first mode to a second mode, the second mode consuming less energy than the first mode.

* * * * *